United States Patent [19]

Chumley

[11] Patent Number: 4,847,886
[45] Date of Patent: Jul. 11, 1989

[54] METHOD FOR CAUSING LARGE NUMBERS OF TELEPHONES TO DIAL THE SAME TELEPHONE NUMBERS

[76] Inventor: Norris J. Chumley, 20 Desbrosses St., New York, N.Y. 10013

[21] Appl. No.: 48,031

[22] Filed: May 11, 1987

[51] Int. Cl.$^4$ .......................................... H04M 11/00
[52] U.S. Cl. ...................................... 379/56; 379/91; 379/97; 379/444; 379/354
[58] Field of Search ...................... 379/56, 57, 58, 444, 379/92, 99, 97, 354, 355, 211, 386, 63; 358/143, 144, 145; 340/825.44, 311.1

[56] References Cited

U.S. PATENT DOCUMENTS

| | | | |
|---|---|---|---|
| 3,982,277 | 5/1975 | De Pedro et al. | 379/444 |
| 4,071,697 | 1/1978 | Bushnell et al. | 379/99 |
| 4,160,124 | 7/1979 | Law . | |
| 4,348,550 | 9/1982 | Pirz et al. . | |
| 4,356,509 | 10/1982 | Skerlos et al. | 358/85 |
| 4,417,100 | 11/1983 | Carlston et al. . | |
| 4,451,700 | 5/1984 | Kempner et al. | 379/88 |
| 4,456,925 | 6/1984 | Skerlos et al. | 358/85 |
| 4,490,579 | 12/1984 | Godoshian | 379/354 |
| 4,523,055 | 6/1985 | Hohl et al. | 379/89 |
| 4,560,833 | 12/1985 | Weber et al. . | |
| 4,566,030 | 1/1986 | Nickerson et al. | 358/84 |
| 4,584,602 | 4/1986 | Nakagawa | 379/92 |
| 4,614,107 | 2/1987 | Clowes et al. | 379/354 |

OTHER PUBLICATIONS

D M News, article by Jim Emerson, 9/15/87.
"Fund Raising Management", May 1987, p. 24.
"New York", Mar. 23, 1987, p. 24.
"Teleconnect Magazine", Apr. 1987, p. 98.
"Friday Report", Mar. 13, 1987, p. 2.

Primary Examiner—Robert Lev
Attorney, Agent, or Firm—Marmorek, Guttman & Rubenstein

[57] ABSTRACT

The invention relates to a method for causing a plurality of telephone calls to a predetermined telephone number. A broadcast of the audio signal associated with the predetermined telephone number is made so that receivers producing the audible signals associated with the predetermined telephone number can cause telephones to transmit the predetermined telephone number.

16 Claims, 1 Drawing Sheet

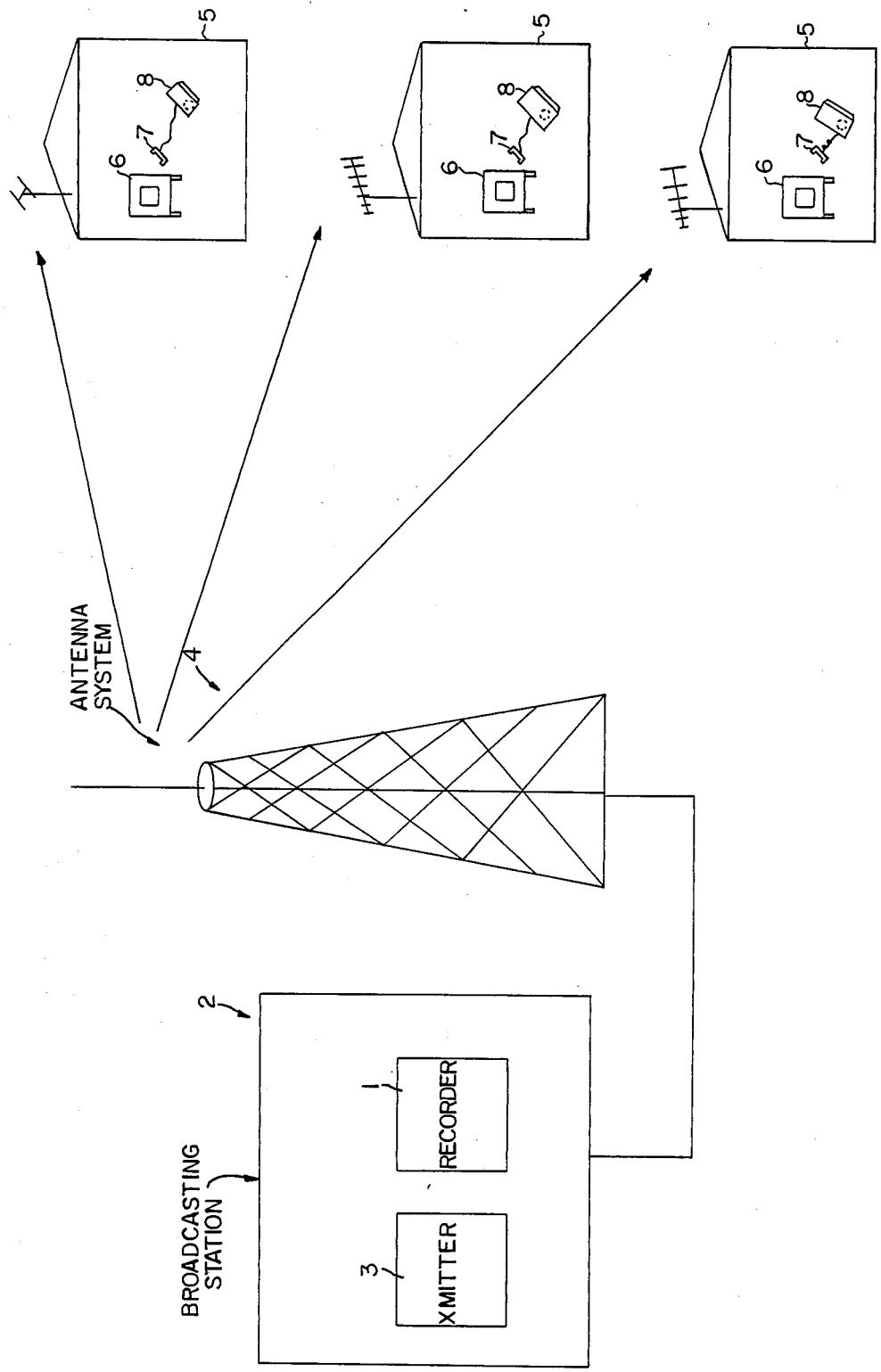

METHOD FOR CAUSING LARGE NUMBERS OF TELEPHONES TO DIAL THE SAME TELEPHONE NUMBERS

FIELD OF THE INVENTION

This invention relates to a method for dialing telephones and more particularly to a method for causing large numbers of telephones to dial the same telephone number.

BACKGROUND OF THE INVENTION

Generally, a primary basis for advertisers to use radio and television braodcasting systems is to increase the sale of products, services and the like or to solicit funds to support for charitable or non-profit organizations. The advertisements are usually in three categories: people are encouraged to go to a company or store to purchase certain products or services; people are induced to send letters to an address provided in the broadcast; and people are induced to telephone a given telephone number in order to obtain a commitment from the people immediately.

For many organizations, obtaining telephone responses increases the likelihood of securing an immediate commitment from people to purchase, support, or contribute to the subject of the advertisement. In solicitations for telephone calls, both radio and television advertisers have their telephone numbers repeated and television advertisers often include a picture transmission showing the telephone numbers to be telephoned.

It is believed that one of the reasons many people do not respond to advertisements requesting them to make telephone calls is that people find it inconvenient to either memorize or write down the telephone number to be called. This problem is dealt with in the prior art by the user of repetition and particularly the use of telephone numbers easily memorized. The invention eliminates the necessity of people memorizing or even physically dialing a telephone number in order to place telephone calls.

SUMMARY OF THE INVENTION

The present invention relates to a method for causing a plurality of telephones to transmit or dial a predetermined telephone number. The invention relies on the fact that most telephones transmit or dial a particular telephone number by transmitting an electronic audio signal corresponding to a sequence of audible tones.

In accordance with an illustrative embodiment of the present invention, at a broadcasting station, an audio electronic signal corresponding to a particular predetermined telephone number is generated. The audio electronic signal is then modulated onto a carrier and broadcast for receipt by numerous receiving stations such as radios or television sets. From the received audio electronic signal, the receivers generate the sequence of audible tones which are then capable of causing telephones whose handsets are positioned to receive the audible tones to dial or transmit the predetermined telephone number. In this way large numbers of telephones can be caused to dial the same telephone number. This is of substantial benefit to merchandisers of goods who rely on television and radio advertising to generate sales by telephone.

In an alternative embodiment of the invention, at the broadcasting station, the sequence of audible tones may be generated and converted into an audio electronic signal by means of a microphone.

BRIEF DESCRIPTION OF THE DRAWING

The sole FIGURE is a pictorial representation of a broadcasting station using the invention and telephone handsets positioned for responding to the broadcasting station.

DESCRIPTION OF INVENTION

This invention is primarily operative for telephone which respond to audible tones and/or corresponding electronic audio signals to transmit or dial telephone numbers. Such telephones are dual tone multi-frequency (DTMF) type telephones and are generally referred to as TOUCH-TONE telephones which are conventional and commonly used in homes and businesses. It is well known that during the dialing of a telephone number on a telephone such as a TOUCH-TONE telephone, a sequence of audible tones is produced by a multi-tone synthesizer and can be heard.

The sequence of audible tones and the corresponding electronic audio signal are associated with a specific telephone number.

The present invention takes advantage of the fact that TOUCH-TONE type telephones can transmit a telephone number by the use of audible tones picked up by the handsets of the telephones. The term "handset" herein refers to and includes the portion of the telephone which is used for picking up audible sounds to be transmitted by the telephone.

Illustratively, in carrying out the invention, a sequence of audible tones corresponding to a specific telephone number is generated. The sequence of audible tones is converted into an electronic audio signal, for example, by direct recording methods, or alternatively by means of a microphone. To cause the mass dialing of the specific telephone number, the audio signal is modulated onto an electromagnetic carrier. A radio or television broadcast in the form of the modulated electromagnetic carrier is transmitted.

The broadcast is received by a plurality of receivers which may be radios or television sets. The receivers regenerate the audible tones associated with the predetermined number and handsets of TOUCH-TONE type telephones can receive the audible tones. The audible tones are transmitted by the telephones, thereby making telephone calls to the specific telephone number.

Preferably a response can be obtained by holding the telephone handsets directly adjacent to the speakers of the television or radio receiver in order to improve the reception of the audible tones by the handsets.

Referring to the Figure, a sound recording system such as a conventional recorder 1 is used to record audible tones similar to those produced during the dialing of a selected telephone number on a TOUCH-TONE type telephone, or from a multi-tone synthesizer, or the like. The recorder 1 is preferably a high quality professional type recorder and can be a commercially available broadcast quality recorder. The audible tones may be recorded as an audio electronic signal.

A recording of the audio electronic signal corresponding to the audible tones of a specific telephone number can be directly recorded using conventional equipment commercially available for recording telephone conversations. Such equipment couples into the electrical circuits of the telephone to sense the audio signal and does not use the audible tones at all. Preferably, the recording is made directly into the recorder without using a microphone or the like.

The recorder 1 is used in a television broadcasting station 2 to introduce the audible tones in the form of an electronic audio signal as part of the information content transmitted by equipment 3 from a broadcast antenna system 4. Preferably, the electronic audio signal is inputted directly for modulating the broadcast carrier without the use of audible tones. Several homes 5 are represented pictorially as having television sets 6 receiving the broadcast signal from the broadcast antenna system 4 and generating or regenerating the audible tones. Telephone handsets 7 from TOUCH-TONE type telephones 8 are positioned to respond to the audible tones from the television sets 6. This results in each of the telephones 8 transmitting the selected telephone number.

Preferably, the telephone handset should be directly next to the speaker poducing the audible tones. The loudness of the speaker should be normal or average in order to avoid distortion from excessive audio levels. Preferably, a monaural speaker system is used rather than a stereo simulator or the like. In addition, the response of the telephone handset to the reproduced audible tones is better if there is no background noise or music transmitted along with the audio signals.

Finally, the above-described embodiments of the invention are intended to be illustrative only. Numerous alternative embodiments may be devised by those skilled in the art without departing from the spirit and scope of the following claims.

I claim:

1. A method for causing a plurality of telephones to transmit a predetermined telephone number, comprising modulating a public broadcast signal with a DTMF signal corresponding to said predetermined telephone number;

broadcasting said modulated public broadcast signal for receipt by a plurality of receivers each having an audio frequency transducer;

demodulating said modulated public broadcast signal the immediately generator a sequence of DTMF audible tones corresponding to said telephone number immediately upon receipt of said modulated broadcast signal and immediately radiating said sequence of DTMF audible tones from said transducer so that a telephone receiving said sequence of audible tones will transmit said telephone number into a public telephone system.

2. The method of claim 1 further comprising recording said DTMF signal and thereafter using said recorded DTMF signal to modulate said public broadcast signal.

3. The method of claim 1 wherein said public broadcast signal is a radio signal.

4. The method of claim 1 wherein said public broadcast signal is a television signal.

5. The method of DTMF claim 1 wherein said sequence of audible tones is generated by said plurality of receivers simultaneously.

6. A method for causing a plurality of telephones to transmit a predetermined telephone number, comprising modulating a public broadcast signal with a DTMF signal corresponding to said predetermined telephone number;

broadcasting said modulated public broadcast signal for receipt by a plurality of television or radio sets each having an audio frequency transducer;

demodulating said modulated public broadcast signal to immediately generate a sequence of DTMF audible tones corresponding to said telephone number by said television or radio sets and immediately radiating said sequence of DTMF tones from said transducer so that a telephone receiving said sequence of DTMF audible tones from one of said television or radio sets will transmit said telephone number into a public telephone system.

7. The method of claim 6 wherein said modulated public broadcast signal is demodulated and said sequence of DTMF audible tones is generated immediately upon receipt of said modulated public broadcast signal.

8. The method of claim 6 further comprising recording said DTMF signal and thereafter using said recorded DTMF signal to modulate said public broadcast signal.

9. The method of claim 6 wherein said public broadcast signal is a radio signal.

10. The method of claim 6 wherein said public broadcast signal is a television signal.

11. The method of claim 6 wherein said sequence of DTMF audible tones is generated by said plurality of television or radio sets simultaneously.

12. A method for causing a plurality of telephones to transmit a predetermined telephone number, comprising modulating a public broadcast signal with a DTMF signal corresponding to said predetermined telephone number;

broadcasting said modulated public broadcast signal for receipt by a plurality of receivers each having an audio frequency transducer;

demodulating said modulated public broadcast signal and generating a sequence of DTMF audible tones corresponding to said telephone number immeidately upon receipt of said modulated public broadcast signal and immediately radiating said sequence of DTMF audible tones from said transducer so that a plurality of telephones receiving said sequence of DTMF audible tones from said plurality of receivers will transmit said telephone number into a public telephone system.

13. The method of claim 12 further comprising recording said DTMF signal and thereafter using said recorded DTMF signal to modulate said public broadcast signal.

14. The method of claim 12 wherein said public broadcast signal is a radio signal.

15. The method of claim 12 wherein said public broadcast signal is a television signal.

16. The method of claim 12 wherein said sequence of DTMF audible tones is generated by said plurality of receivers simultaneously.

* * * * *